United States Patent
Yun et al.

(10) Patent No.: US 8,149,348 B2
(45) Date of Patent: Apr. 3, 2012

(54) DISPLAY DEVICE AND LENTICULAR SHEET OF THE DISPLAY DEVICE AND METHOD THEREOF

(75) Inventors: Hae-Young Yun, Suwon-si (KR); Seung-Hoon Lee, Yongin-si (KR); Hee-Seop Kim, Hwanseong-si (KR); Sung-Woon Kim, Suwon-si (KR); JianGang Lu, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 414 days.

(21) Appl. No.: 12/425,549

(22) Filed: Apr. 17, 2009

(65) Prior Publication Data
US 2009/0262420 A1 Oct. 22, 2009

(30) Foreign Application Priority Data
Apr. 22, 2008 (KR) .................. 10-2008-0037267

(51) Int. Cl.
*G02F 1/1335* (2006.01)

(52) U.S. Cl. .................................... 349/57

(58) Field of Classification Search .............. 349/57
See application file for complete search history.

(56) References Cited

U.S. PATENT DOCUMENTS

| | | | | |
|---|---|---|---|---|
| 4,959,641 A | * | 9/1990 | Bass et al. .................. 345/6 |
| 5,808,599 A | * | 9/1998 | Allio .......................... 345/6 |
| 6,859,240 B1 | * | 2/2005 | Brown et al. ................ 349/15 |
| 7,019,801 B2 | * | 3/2006 | Ueki et al. .................. 349/113 |
| 7,091,652 B2 | * | 8/2006 | Morley et al. .............. 313/110 |
| 7,450,188 B2 | * | 11/2008 | Schwerdtner ............... 349/15 |
| 7,551,353 B2 | * | 6/2009 | Kim et al. ................... 359/462 |
| 7,969,463 B2 | * | 6/2011 | Takaki ........................ 348/59 |
| 2008/0158344 A1 | * | 7/2008 | Schechterman et al. .... 348/46 |
| 2008/0180587 A1 | * | 7/2008 | Tomizuka et al. .......... 349/15 |
| 2008/0259233 A1 | * | 10/2008 | Krijn et al. ................. 349/15 |
| 2009/0256997 A1 | * | 10/2009 | Misono et al. .............. 349/64 |

FOREIGN PATENT DOCUMENTS

| | | |
|---|---|---|
| JP | 2006072213 A | 3/2006 |
| KR | 1020060039707 A | 5/2006 |
| KR | 1020070013922 A | 1/2007 |

* cited by examiner

*Primary Examiner* — Sung Pak
(74) *Attorney, Agent, or Firm* — Cantor Colburn LLP

(57) ABSTRACT

A display device includes a display panel on which a plurality of pixels are arranged in a matrix, and a lenticular sheet which is disposed above the display panel and includes a plurality of prism lenses disposed on the lenticular sheet. Each of the plurality of prism lenses includes a first surface, a second surface and a third surface. Each surface of the prism lens is disposed extending in a first direction substantially parallel to a longitudinal direction of the prism lenses, and arranged substantially parallel with each other.

19 Claims, 13 Drawing Sheets

DISPLAY DEVICE AND LENTICULAR SHEET OF THE DISPLAY DEVICE AND METHOD THEREOF This application claims priority to Korean Patent Application No. 10-2008-0037267 filed on Apr. 22, 2008, and all the benefits accruing therefrom under 35 U.S.C. §119, the disclosure of which is incorporated herein by reference in its entirety.

BACKGROUND OF THE INVENTION

1. Field of the Invention

The present invention relates to a display device and a lenticular sheet of the display device, and more particularly, to a display device, which can prevent three-dimensional ("3D") image crossing, improve the uniformity of the distribution of luminance and thus enhance the quality of a 3D image, and a lenticular sheet of the display device.

2. Description of the Related Art

There has been an increasing demand for flat panel display devices such as plasma display panel ("PDP") devices, plasma-addressed liquid crystal ("PALC") display panel devices, liquid crystal display (LCD) devices and organic light-emitting diode ("OLED") devices, since conventional cathode ray tube ("CRT") devices cannot meet the demand for thin and large-scale display devices.

Additionally, the overall quality of images displayed by display devices has been considerably improved, and display devices capable of displaying not only two-dimensional ("2D") images but also three-dimensional ("3D") images have been developed. Such stereoscopic display devices can provide 3D images using the fact that the left and right eyes see slightly different images.

Methods of displaying 3D images may involve the use of special glasses, holograms, a lenticular sheet or a barrier.

In methods of displaying 3D images using a lenticular sheet, a 2D image of an object is divided into an image for the right eye and an image for the left eye by using a lenticular sheet, thereby enabling the object to be perceived three-dimensionally using the differences between the image for the right eye and the image for the left eye.

BRIEF SUMMARY OF THE INVENTION

Methods of displaying 3D images using a lenticular sheet may have disadvantages, such as that they may result in a black matrix moire phenomenon, in which black matrices are viewed at regular intervals. Consequently, the black matrix moire phenomenon may disadvantageously lower the luminance of 3D images, narrow viewing angles, cause color bleeding and eventually lower the overall quality of 3D images. The black matrices means areas where light can't be transmitted.

Exemplary embodiments provide a display device which can reduce or effectively prevent three-dimensional ("3D") image crossing, improve the uniformity of the distribution of luminance and thus enhance the quality of a 3D image, and a lenticular sheet of the display device.

However, the aspects, features and advantages of the present invention are not restricted to the ones set forth herein. The above and other aspects, features and advantages of the present invention will become more apparent to one of ordinary skill in the art to which the present invention pertains by referencing a detailed description of the present invention given below.

In an exemplary embodiment of the present invention, there is provided a display device including a display panel on which a plurality of pixels are arranged in a matrix, and a lenticular sheet disposed above the display panel. The lenticular sheet includes a plurality of prism lenses disposed on the lenticular sheet. Each of the plurality of prism lenses includes a first surface, a second surface and a third surface. Each surface of the prism lens is disposed extending in a first direction substantially parallel to a longitudinal direction of the prism lenses, and arranged substantially parallel with each other.

In an exemplary embodiment of the present invention, there is provided a lenticular sheet including a base and a plurality of prism lenses disposed on the base. Each of the plurality of prism lenses including a first surface, a second surface and a third surface, each surface being disposed extending in a first direction corresponding to a longitudinal direction of the prism lenses, the first surface, the second surface and the third surface being arranged substantially parallel to each other.

In an exemplary embodiment of the present invention, there is provided a method of forming a display device. The method includes disposing a plurality of pixels of a display panel in a plurality of columns arranged substantially in a first direction, and in a plurality of rows arranged substantially in a second direction perpendicular to the first direction, disposing a black matrix adjacent to all edges of each pixel of the plurality of pixels, forming a lenticular sheet including a plurality of prism lenses, disposing the lenticular sheet above the display panel such that each view of the display panel through a prism includes an entire of a first pixel to be observed, black matrices BM that surround the first pixel to be observed, and part of a second pixel adjacent to the first pixel be observed. Each of the prism lenses includes a first surface, a second surface and a third surface, each surface being disposed extending in the first direction. The first surface, the second surface and the third surface are arranged at an angle to each other, and each of the first, second, third surface is disposed extending in a first direction substantially parallel to a longitudinal direction of the prism lens. The second surface is disposed at a central area of the prism lens, in a plan view.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
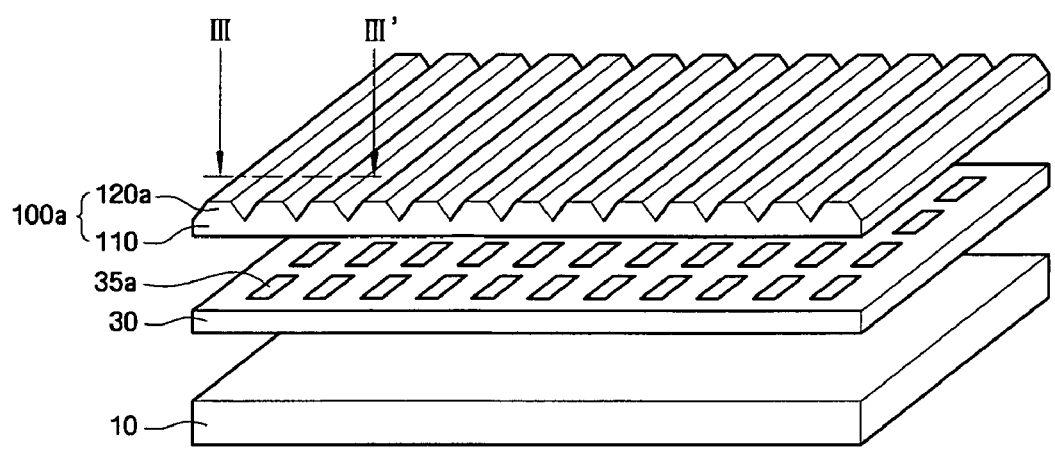
FIG. 1 illustrates an exploded perspective view of an exemplary embodiment of a display device according to the present invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, like reference numerals indicate like elements, and thus, detailed descriptions thereof will be skipped. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below", "lower", "under," "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

A display device according to an exemplary embodiment of the present invention will hereinafter be described in detail with reference to FIGS. 1 through 4C.

Figure 2:
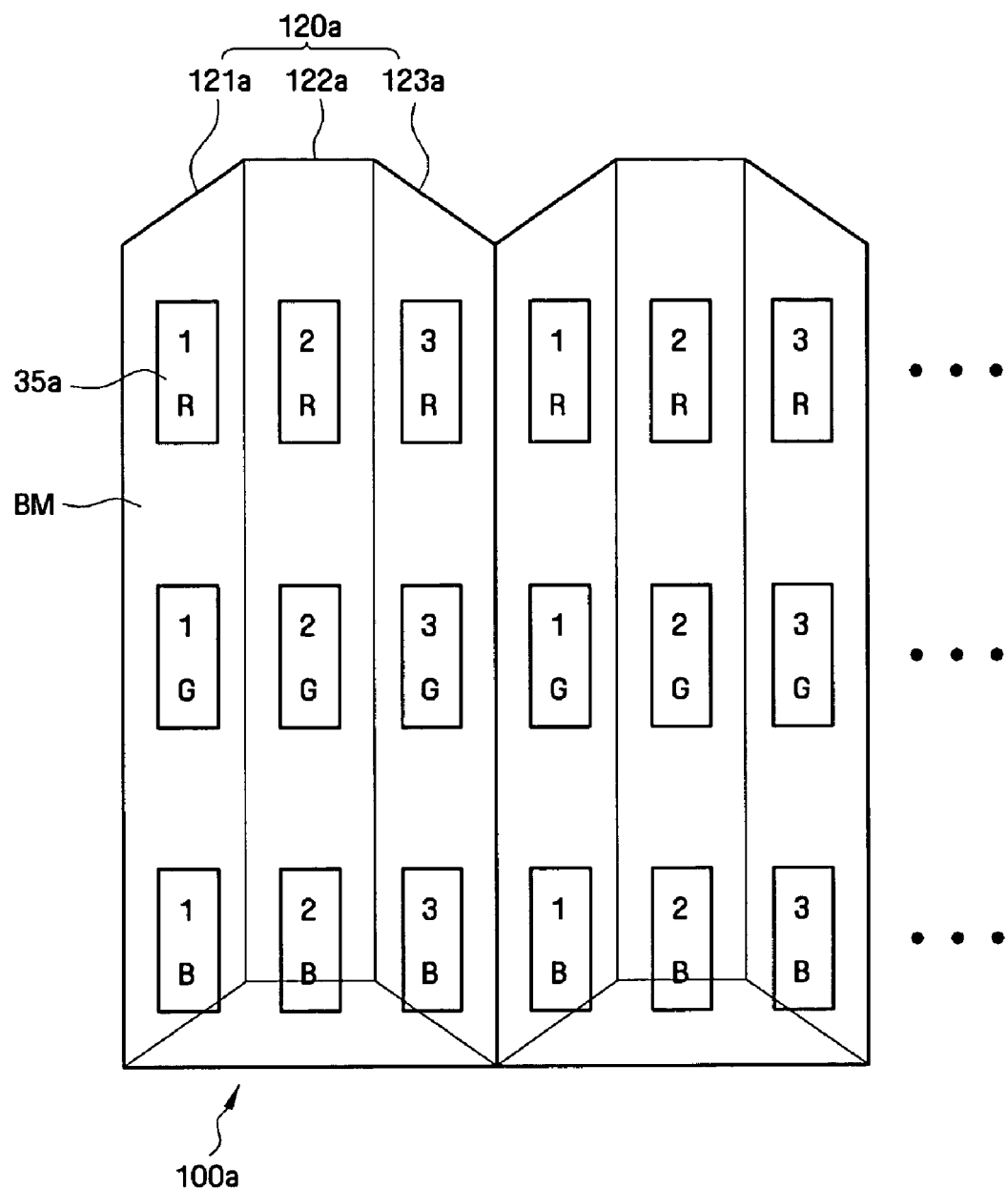
FIG. 2 illustrates an exemplary embodiment of a plan view of part of a lenticular sheet illustrated in FIG. 1, and a plurality of pixels that underlie the lenticular sheet.
Figure 3:
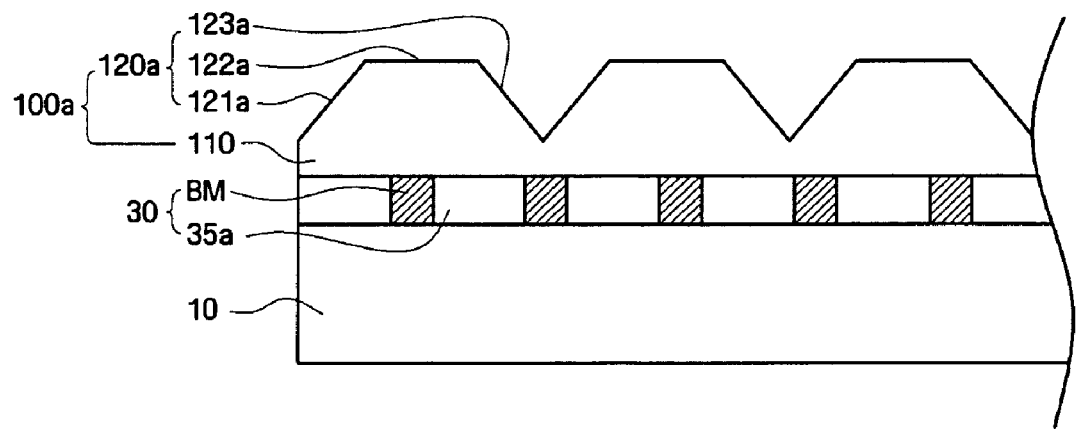
FIG. 3 illustrates a cross-sectional view taken along line III-III' of FIG. 1.

FIG. 1 illustrates an exploded perspective view of an exemplary embodiment of a display device according to the present invention, FIG. 2 illustrates a plan view of part of a lenticular sheet 100a illustrated in FIG. 1 and a plurality of pixels 35a that underlie the lenticular sheet 100a, FIG. 3 illustrates a cross-sectional view taken along line III-III' of FIG. 1, and FIGS. 4A through 4C illustrate diagrams for explaining various optical paths for different observation positions, from which the lenticular sheet 100a is observed.

Referring to FIG. 1, the display device includes the lenticular sheet 100a, a display panel 30 and a backlight assembly 10.

The lenticular sheet 100a enables a plurality of pixels 35a on the display panel 30 to be selectively recognizable according to an observation position. The lenticular sheet 100a may include a base 110 and a plurality of prism lenses 120a, which are disposed on the base 110. The base 110 is substantially flat, or plate shaped, and a bottom surface of the base 110 may be substantially planar. In a plan view, the prism lenses 120a may be arranged in a direction substantially parallel with a horizontal direction in which the pixels 35a are arranged, or may be arranged at an inclination to the horizontal direction in which the pixels 35a are arranged. Hereinafter, The pixels means areas where light from the backlight assembly 10 is controlled to display image.

The base 110, which is part of the lenticular sheet 100a, maintains the shape of the prism lenses 120a. In exemplary embodiments, the base 110 may include a transparent material, and may be formed in one body with the prism lenses 120a. The lenticular sheet 100a is considered a single, continuous and indivisible member, where the base 110 and the prism lenses 120a collectively define the lenticular sheet 100a. The prism lenses 120a may be disposed directly adjacent to one another as illustrated in FIG. 1, or there may alternatively be another feature disposed between and alternating with the prism lenses 120a.

The prism lenses 120a protrude from a top surface and/or a bottom surface of the base 110, and extend over the base 110 along a predetermined direction. An extension direction of the prism lenses 120a is taken along a first direction of the prism lenses 120a, substantially parallel with a longitudinal direction of the prism lenses 120a. The longitudinal direction may hereinafter be referred to as an axial direction. An arrangement direction of the prism lenses 120a is taken along a second direction, substantially perpendicular to the longitudinal direction of the prism lenses 120a and to the first direction. The prism lenses 120a may extend over a whole of a distance along the first direction of the respective surface of the base 110, or may be extended only a portion of the distance along the first direction of the base 110. Similarly, the prism lenses 120a may be arranged on an entire of a distance along the second direction of the respective surface of the base 110, or may be arranged on only a portion of the distance along the second direction of the base 110.

In an exemplary embodiment, the prism lenses 120a may be obtained by appropriately cutting cylinder lenses or elliptical cylinder lenses. The prism lenses 120a may be multifocal lenses or may include a plurality of cut surfaces. The lenticular sheet 100a will be described later in further detail.

The display panel 30 displays images and includes the pixels 35a. The pixels 35a are arranged on the display panel 30 in substantially a matrix, such as shown in the plan view of FIG. 2. The pixels 35a are substantially uniformly arranged both horizontally and vertically, according to a predetermined rule. A series of consecutively arranged pixels 35a along either a vertical direction (e.g., a longitudinal direction of the prism lenses 120a), or along a horizontal direction (e.g., transverse to the longitudinal direction) may be referred to as a "group" of pixels 35a.

Each of the pixels 35a may form a pixel of an image, and may represent one of red, green and blue. The display panel 30 may be a plasma display panel ("PDP"), a plasma address liquid crystal display panel ("PALC"), a liquid crystal display ("LCD") panel, or an organic light-emitting diode ("OLED") panel. In the illustrated embodiment, the display panel 30 is an LCD panel.

The backlight assembly 10 is disposed below the display panel 30, e.g., opposite to a viewing side of the display device relative to the display panel 30. Since the display panel 30 is a passive display panel, such as an LCD panel which requires an additional light source, the backlight assembly 10 may be disposed below the display panel 30, and may provide light to the display panel 30.

The display panel 30 may display various images by being provided with light by the backlight assembly 10. Due to the lenticular sheet 100a of the illustrated embodiment, images displayed by the display panel 30 may appear different to a viewer according to the viewpoint of the viewer at the viewing side of the display device.

The prism lenses 120a and the pixels 35a will hereinafter be described in further detail with reference to FIGS. 2 and 3.

Referring to FIG. 2, a plurality of pixels 35a may be substantially uniformly arranged in a matrix. Each of the pixels 35a may represent one of a plurality of colors. Adjacent pixels 35a, which are arranged at row direction within a lenticular lens, may display different images, based on different viewing angles.

The lenticular sheet 100a is disposed over the pixels 35a, e.g., opposite to the backlight assembly 10 relative to the display panel 30. The pixels 35a may be viewed through the prism lenses 120a of the lenticular sheet 100a. Each of the prism lenses 120a may include a plurality of flat surfaces: first, second and third surfaces 121a, 122a and 123a, respectively. These flat surfaces may hereinafter be referred to as linear surfaces. The first, second and third surfaces 121a, 122a and 123a of each of the prism lenses 120a may not necessarily be flat. In an embodiment, the first, second and third surfaces 121a, 122a and 123a of each of the prism lenses 120a may be curved.

A black matrix BM is disposed adjacent to all sides of each of the pixels 35a, as illustrated in FIG. 2. In a plan view, the black matrix BM and the pixels 35a collectively define an entire of a surface of the lenticular sheet 100a. The black matrix BM is considered to completely surround the pixels 35a in the plan view, and alternates with the pixels 35a in the first and second directions of the prism lenses 120a. The exemplary embodiment is not restricted to a structure of the black matrix BM. The black matrix BM means the area where light from the back light assembly 10 isn't transmitted.

A focal distance of each of the prism lenses 120a may substantially coincide with a number of pixels 35a to be viewed. Each of the prism lenses 120a may have different focal distances from one portion to another. The angles between the first and second surfaces 121a and 122a of each of the prism lenses 120a, and between the second and third surfaces 122a and 123a of each of the prism lenses 120a may be appropriately determined according to the refractive index of the prism lenses 120a and/or the position of and the distance from a viewer.

A plurality of pixels 35a may be arranged in a matrix below the prism lenses 120a. Black matrices BM may be disposed among the pixels 35a and may block the transmission of light. The prism lenses 120a may form multiple viewpoints in a direction parallel to the axial direction of the prism lenses 120a. In the illustrated embodiment, the prism lenses 120a may be disposed such that different pixels 35a can be seen differently, according to an observation point from which each of the prism lenses 120a is observed.

In order to form multiple viewpoints of a group of pixels 35a, a plurality of pixels 35a may be overlapped by each of the prism lenses 120a along a direction perpendicular to the axial direction of the prism lenses 120a, such as in a the plan view of FIG. 2. Advantageously, different pixels 35a are able to be seen according to an observation angle with which each of the prism lenses 120a is observed.

A number of pixels 35a corresponding to the number of surfaces, e.g., flat surfaces, of each of the prism lenses 120a may be overlapped by each of the prism lens 120a along the direction perpendicular to the axial direction of the prism lenses 120a.

Referring to FIG. 2, a first group of pixels 35a arranged in a vertical direction is completely overlapped with the first flat surface 121a. Similarly, a second group and a third group each arranged in the vertical direction are completely overlapped with the second flat surface 122a and the third flat surface 123a, respectively. Each pixel 35a arranged in horizontal fourth, fifth and sixth groups of pixels 35a is respectively completely overlapped with the first, second and third flat surfaces 121a, 122a and 123a. In a plan view, each group of the pixels 35a defined above, is disposed completely within edges of the respective flat surface, such that none of the pixels 35a overlap with a common edge of two flat surfaces adjacent to each other, or of a boundary of a flat surface.

In exemplary embodiments, the prism lenses 120a may be lenses with a variable refractive index, such as liquid crystal lenses or fluid lenses. Advantageously, it is possible to display both two-dimensional ("2D") images and 3D images, to facilitate the adjustment of multiple viewpoints, and thus to vividly display images.

Figure 4A:
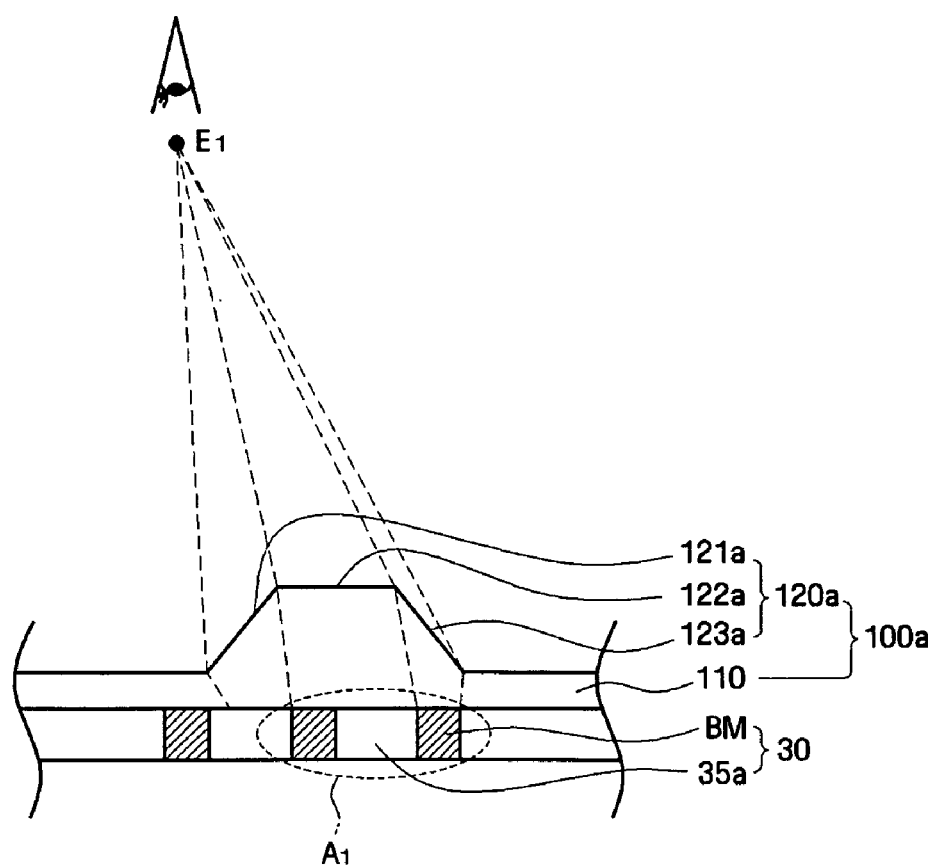
FIGS. 4A through 4C illustrate diagrams for explaining various optical paths for different observation positions, from which the lenticular sheet shown in FIG. 1 is observed.

Referring to FIG. 4A, when a viewer views a prism lens 120a from a position $E_1$, which is on the left of the prism lens 120a, an area $A_1$ on the display panel 30 can be seen through the prism lens 120a. The area $A_1$ accounts for a right part of the overlapping area of the prism lens 120a and the display panel 30. A pixel 35a to be observed may be disposed in the area $A_1$. As indicated by the dotted lines from position $E_1$, an entire of a first pixel 35a to be observed, black matrices BM that surround the first pixel 35a to be observed, and part of a pixel 35a adjacent to the first pixel 35a to be observed can be seen through the prism lens 120a.

Figure 4B:
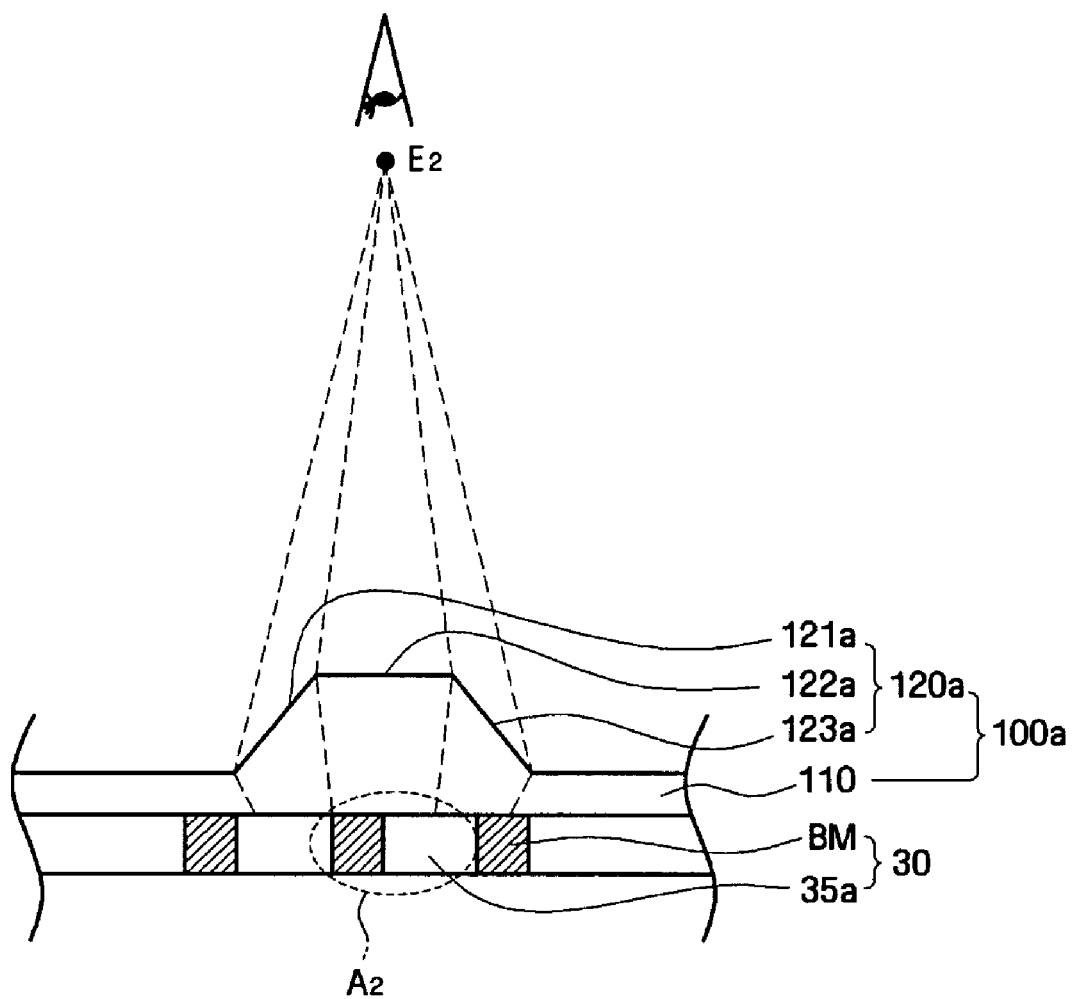

Referring to FIG. 4B, when the viewer views the prism lens 120a from a position $E_2$, which is directly above the center of the prism lens 120a, an area $A_2$ on the display panel 30 can be seen through the prism lens 120a. The area $A_2$ accounts for a middle part of the overlapping area of the prism lens 120a and the display panel 30. A pixel 35a to be observed and a black matrix BM that defines a boundary of the pixel 35a to be observed may be disposed in the area $A_2$. As indicated by the dotted lines from position $E_2$, an entire of a second pixel 35a to be observed, black matrices BM that surround the second pixel 35a to be observed, and part of a pixel 35a adjacent to the second pixel 35a to be observed can be seen through the prism lens 120a.

Figure 4C:
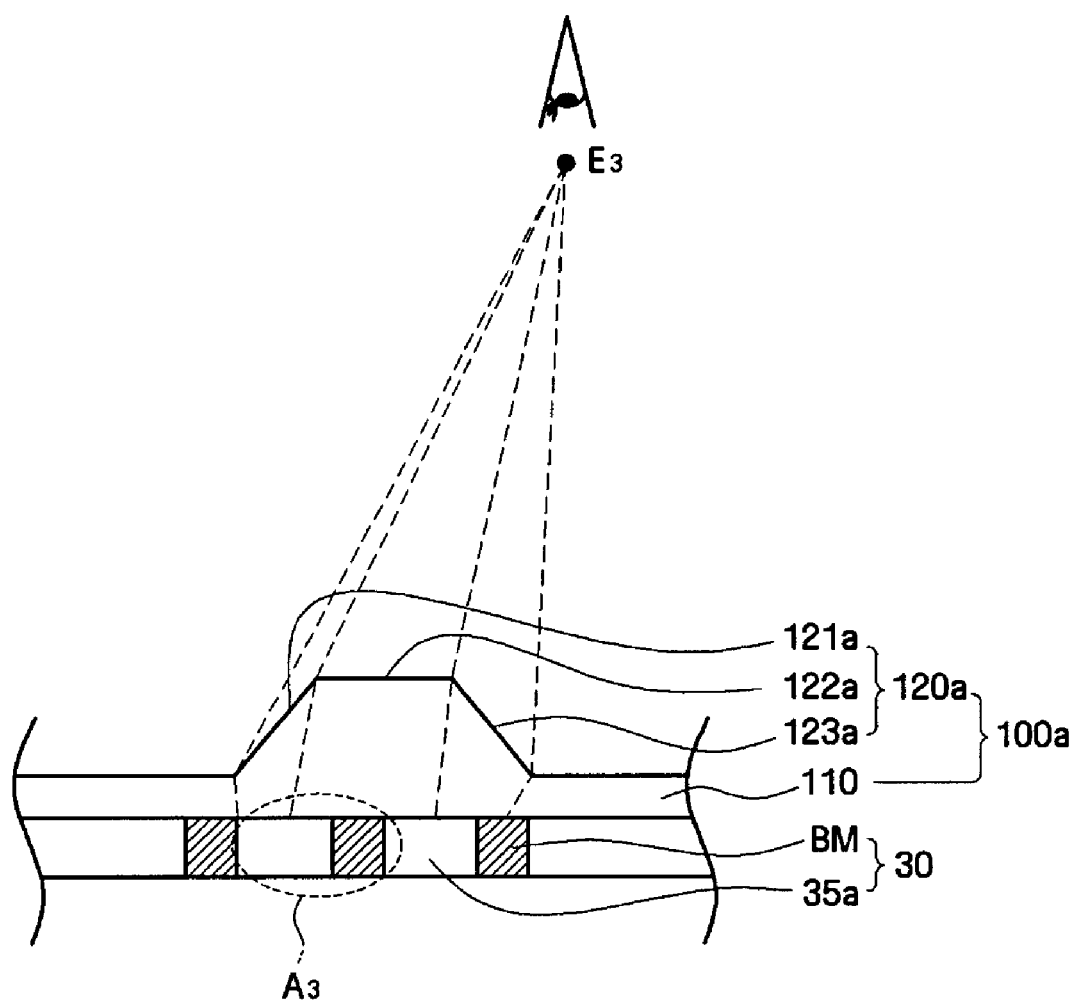

Referring to FIG. 4C, when the viewer views the prism lens 120a from a position $E_3$, which is on the right side of the prism lens 120a, an area $A_3$ on the display panel 30 can be seen through the prism lens 120a. The area $A_3$ accounts for a left part of the overlapping area of the prism lens 120a and the display panel 30. A pixel 35a to be observed may be disposed in the area $A_3$. As indicated by the dotted lines from position $E_3$, an entire of a third pixel 35a to be observed, black matrices BM that surround the third pixel 35a to be observed, and part of a pixel 35a adjacent to the third pixel 35a to be observed can be seen through the prism lens 120a.

Referring to FIGS. 4A through 4C, a main image may appear differently according to an observation angle with which the viewer views the prism lens 120a disposed on the lenticular sheet 100a. If the left and right eyes of the viewer are at the positions $E_1$ and $E_3$, respectively, a main image may appear differently to each of the left and right eyes of the viewer. With the illustrated embodiment, it is possible for the viewer to stereoscopically perceive an object by providing the viewer with a plurality of images of an object viewed from different positions on the display panel 30.

In the meantime, it is possible to adjust images to be seen from each position by adjusting the angles between the first and second surfaces 121a and 122a of each of the prism lenses 120a, and between the second and third surfaces 122a and 123a of each of the prism lenses 120a, or designing the prism lenses 120a to include more than three surfaces. In one exemplary embodiment, an overlapping region may be provided between two images that can be respectively seen from a pair of adjacent positions, thereby preventing an individual image from drastically changing according to the position of a viewer, and reducing or effectively preventing the occurrence of a black matrix moire phenomenon, such as when only the black matrices BM among the pixels 35a are seen.

It is possible to provide a display device 1 (refer to FIG. 9) having multiple viewpoints, and to provide more realistic 3D images by appropriately altering the arrangement of the prism lenses 120a and the arrangement of the pixels 35a below the prism lenses 120a. The display device 1 having multiple viewpoints may display moving images.

Figure 5A:
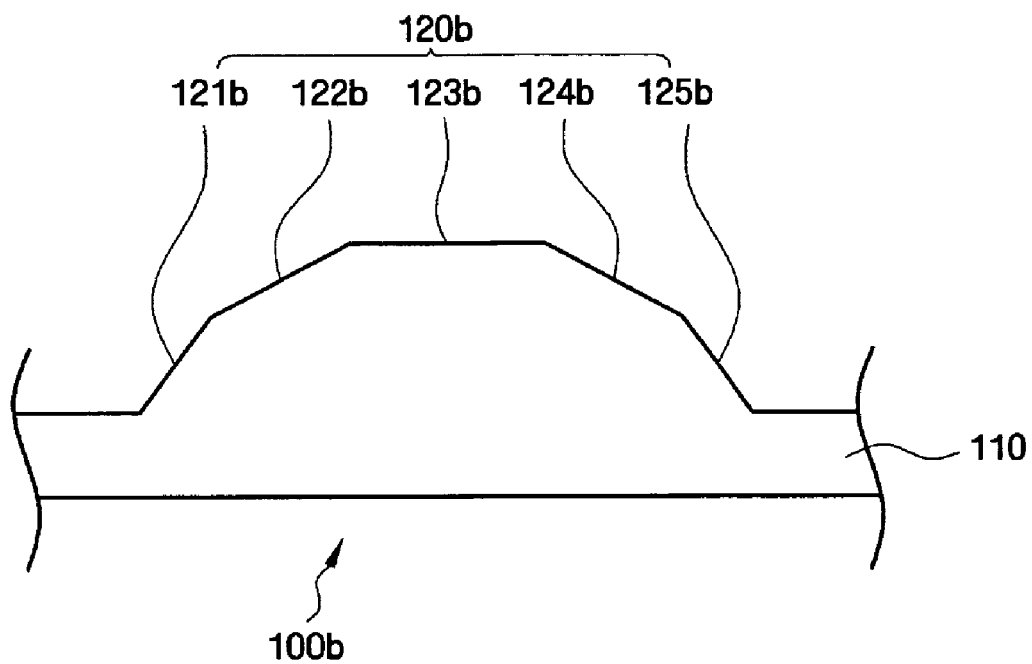
FIG. 5A illustrates another exemplary embodiment of the lenticular sheet shown in FIG. 1.
Figure 5B:
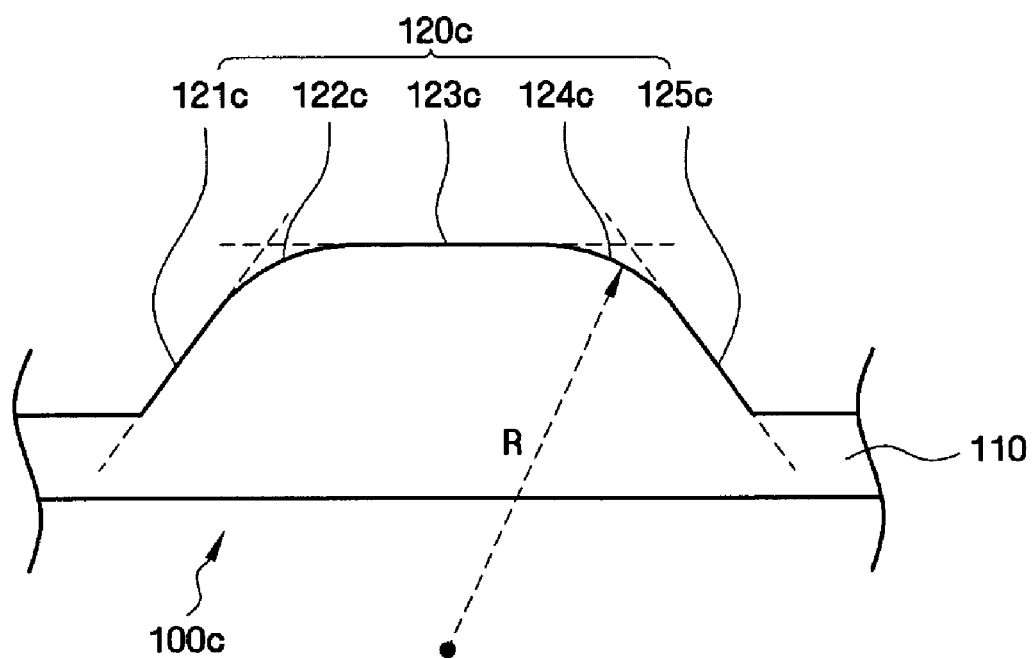
FIG. 5B illustrates another exemplary embodiment of the lenticular sheet shown in FIG. 1.
Figure 5C:
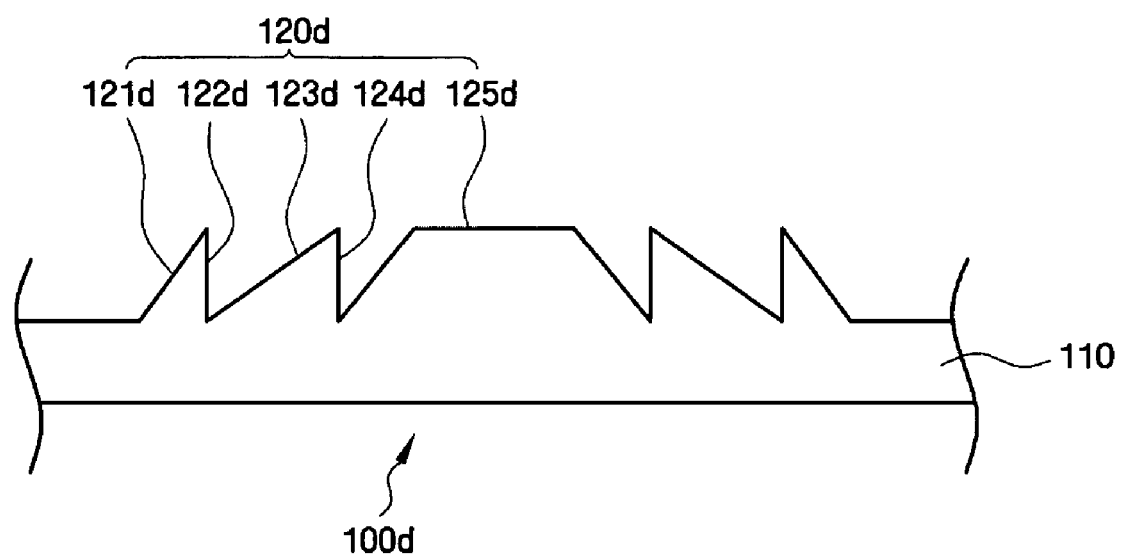
FIG. 5C illustrates another exemplary embodiment of the lenticular sheet shown in FIG. 1.

Variations of the lenticular sheet 100a of the display device 1 of the illustrated embodiment of FIGS. 1 through 4C will hereinafter be described in detail with reference to FIGS. 5A through 5C. FIG. 5A illustrates another exemplary embodiment of the lenticular sheet 100a, i.e., a lenticular sheet 100b, FIG. 5B illustrates another exemplary embodiment of the lenticular sheet 100a, i.e., a lenticular sheet 100c, and FIG. 5C illustrates still another exemplary embodiment of the lenticular sheet 100a, i.e., a lenticular sheet 100d. In FIGS. 1 through 5C, like reference numerals indicate like elements, and thus, detailed descriptions thereof will be skipped.

Referring to FIG. 5A, the lenticular sheet 100b includes a prism lens 120b which each include first, second, third, fourth and fifth surfaces 121b, 122b, 123b, 124b, and 125b, respectively. The first, second, third, fourth and fifth surfaces 121b, 122b, 123b, 124b and 125b are all flat surfaces, and may be disposed directly adjacent to one another. Each of the first, second, third, fourth and fifth surfaces 121b, 122b, 123b, 124b and 125b refracts light from a number of pixels 35a underlying the prism lens 120b. The prism lens 120b may form five viewpoints due to the first, second, third, fourth and fifth surfaces 121b, 122b, 123b, 124b and 125b. The first, second, third, fourth and fifth surfaces 121b, 122b, 123b, 124b and 125b may be technically flat, and thus, the absolute value of the radius of curvature of the first, second, third, fourth and fifth surfaces 121b, 122b, 123b, 124b and 125b may be indefinite. Alternatively, the radius of curvature of the first, second, third, fourth and fifth surfaces 121b, 122b, 123b, 124b and/or 125b may be at least two times greater than the average radius of curvature of the prism lens 120b.

Referring to FIG. 5B, the lenticular sheet 100c includes a prism lens 120c having a slightly curved profile. The prism lens 120c of the illustrated embodiment includes first, second, third, fourth and fifth surfaces 121c, 122c, 123c, 124c and 125c, respectively. The first, third and fifth surfaces 121c, 123c and 125c are substantially flat, and the second and fourth surfaces 122c and 124c are curved and are disposed between the first and third surfaces 121c and 123c and between the third and fifth surfaces 123c and 125c, respectively. The prism lens 120c including the first, second, third, fourth and fifth surfaces 121c, 122c, 123c, 124c and 125c may be considered as having rounded edges.

The absolute value of the radius of curvature of the first, third and fifth surfaces 121c, 123c, and 125c may be indefinite. Alternatively, the radius of curvature of the first, third and fifth surfaces 121c, 123c, and 125c may be at least two times greater than the average radius of curvature of the prism lens 120c. The present invention is not restricted to the situation when the first, third and fifth surfaces 121c, 123c, and 125c have a convex profile and thus have a positive radius of curvature. In an alternative embodiment, the first, third and fifth surfaces 121c, 123c, and 125c may have a concave profile, and may thus have a negative radius of curvature.

The second and fourth surfaces 122c and 124c are both curved surfaces. The radius R of curvature of the second surface 122c may not necessarily be the same as the radius of curvature of the fourth surface 124c. The first, second, third, fourth and fifth surfaces 121c, 122c, 123c, 124c and 125c may have different radiuses of curvature. It is possible to adjust an image viewed from each observation position by appropriately adjusting the radiuses of curvature of the first, second, third, fourth and fifth surfaces 121c, 122c, 123c, 124c and 125c. Advantageously, it is possible to reduce or effectively prevent the occurrence of a black matrix moire phenomenon and color bleeding.

Referring to FIG. 5C, the lenticular sheet 100d may include a prism lens 120d, which is shaped substantially as a Fresnel lens. A Fresnel lens includes a plurality of convex or concave lenses having a predetermined height or depth. An individual prism lens 120d may include first, second, third, fourth and fifth surfaces 121d, 122d, 123d, 124d and 125d, respectively. A single prism lens may also be collectively considered as including two of the first, second, third and fourth surfaces 121d, 122d, 123d and, 124d, and just one of the fifth surface 125d.

The first and third surfaces 121d and 123d are slanted surfaces. The second and fourth surfaces 122d and 124d are vertical planes extending from the first and third surfaces 121d and 123d, respectively. The second and fourth surfaces 122d and 124d may be substantially perpendicular to an upper surface of the base 110. The first and second surfaces 121d and 122d may collectively form a substantially triangular-shaped first prism part. Similarly, the third and fourth surfaces 123d and 124d may collectively form a substantially triangular-shaped second prism part. A protruding portion of the prism lens 120d including the fifth surface 125d may be referred to as a third prism part. A distance from the upper surface of the base 110 to a distal end of the first prism part, the second prism part and the third prism part, may be substantially the same, but the present invention is not limited thereto. As illustrated in FIG. 5C, the first prism part, the second prism part and the third prism part are disposed directly adjacent to each other.

Light refracted from a number of pixels 35a may be emitted through the first and third surfaces 121d and 123d. The second and fourth surfaces 122d and 124d may serve as total reflection surfaces and may thus reduce or effectively prevent light from leaking into a predetermined zone. The fifth surface 125d is a horizontal plane. The middle part of the prism lens 120d may be observed through the fifth surface 125d.

Since the prism lens 120d is shaped substantially as a Fresnel lens, it is possible to advantageously reduce the thickness of the lenticular sheet 100d and to improve the uniformity of height.

Figure 6A:
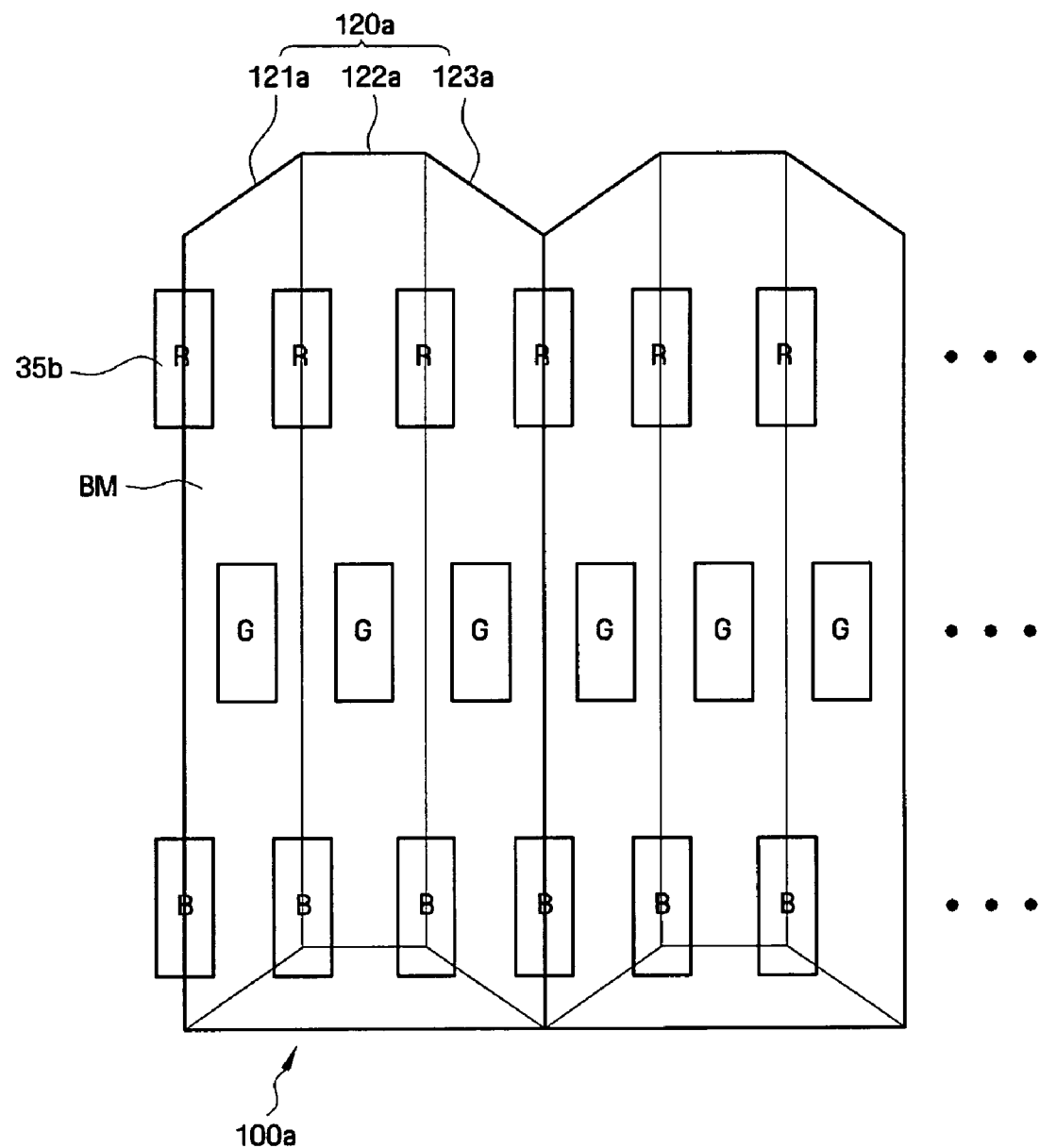
FIG. 6A illustrates another exemplary embodiment of a plan view part of a lenticular sheet of a display device according to the present invention, and a plurality of pixels that underlie the lenticular sheet.
Figure 6B:
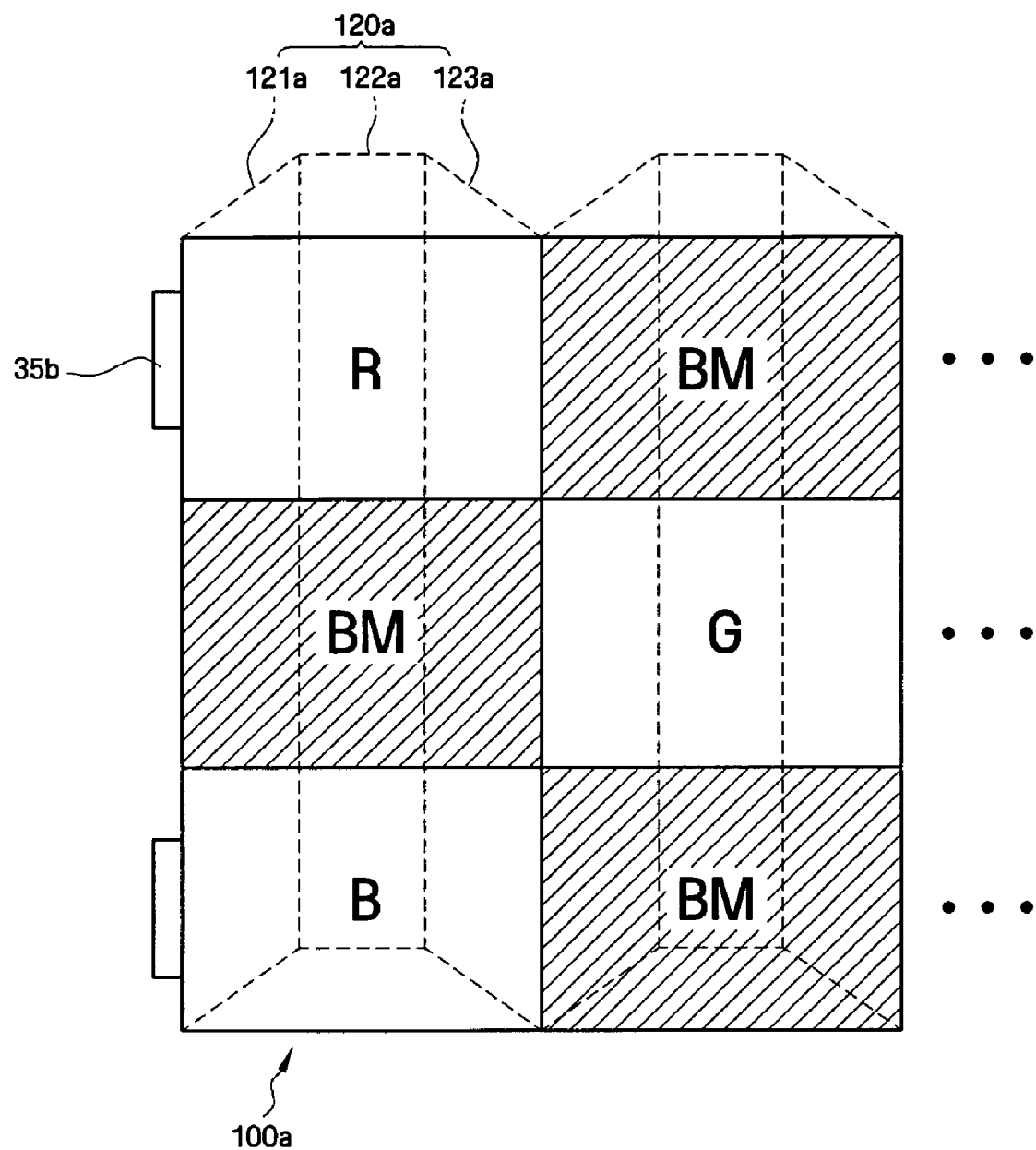
FIG. 6B illustrates a diagram for explaining what a plurality of pixels may look like to the naked eye of a viewer when being viewed through the lenticular sheet shown in FIG. 6A.

A display device according to another exemplary embodiment of the present invention will hereinafter be described in detail with reference to FIGS. 6A and 6B. FIG. 6A illustrates a plan view of an exemplary embodiment of a part of a lenticular sheet 100a of a display device according to the present invention and a plurality of pixels 35b that underlie the lenticular sheet 100a, and FIG. 6B illustrates a diagram for explaining what the pixels 35b may look like to the naked eye of a viewer when being viewed through the lenticular sheet 100a illustrated in FIG. 6A. In FIGS. 1 through 4C, 6A and 6B, like reference numerals indicate like elements, and thus, detailed descriptions thereof will be skipped.

In the illustrated embodiment of FIGS. 6A and 6B, a pair of vertically adjacent pixels 35b are misaligned with each other along the axial direction of a plurality of prism lenses 120a of the lenticular sheet 100a. "Vertically" refers to a vertical direction as observed in the plan view of FIG. 6A.

More specifically, referring to FIG. 6A, the pair of vertically adjacent pixels 35b are misaligned with each other along the axial direction of the prism lenses 120a of the lenticular sheet 100a, whereas a pair of horizontally adjacent pixels 35b are aligned with each other along a direction perpendicular to the axial direction of the prism lenses 120a.

Referring to FIG. 6A, a first (leftmost) group of pixels 35b arranged in a vertical direction is not completely overlapped with the first flat surface 121a of the prism lens 120a. Similarly, a second group and a third group of vertically arranged pixels 35b are also not completely overlapped with the second flat surface 122a and the third flat surface 123a, respectively. In a plan view, each group of the pixels 35a defined above, overlaps a common edge of two flat surfaces adjacent to each other, and every boundary between adjacent flat surfaces is overlapped by a multiple of the pixels 35a.

The pixels 35b shown in the plan view of FIG. 6A overlap the common edge defined by a boundary between the first and second flat surfaces 121a and 122a, the second and third flat surfaces 122a and 123a, and the first and third flat surfaces 121a and 123a. In exemplary embodiments, all of the edges defined by a boundary between adjacent flat surfaces may be overlapped by at least one pixel 35b. Every row (e.g., horizontally disposed) of pixels 35b may include at least one pixel 35b that overlaps an edge between adjacent flat surfaces. Alternatively as shown in FIG. 6A, only odd rows may include a first portion of the pixels 36b overlapping edges between adjacent flat surfaces, while even rows include a second portion of the pixels 35b disposed entirely between adjacent edges of the flat surfaces.

FIG. 6B illustrates a diagram for explaining what the pixels 35b may look like when being viewed from a predetermined observation point through the prism lenses 120a illustrated in FIG. 6A. Referring to FIG. 6B, each of the pixels 35b appears to be large enough to have the same width as that of the prism lenses 120a when being viewed through the lenticular sheet 100a illustrated in the plan view of FIG. 6A.

An image that can be seen from a predetermined observation position may include a mosaic of a plurality of pixels 35b and black matrices BM. A plurality of images that are divided along the axial direction of the prism lenses 120a may be seen through the prism lenses 120a. As illustrated in FIG. 6A, the pixels 35b may be arranged such that a pair of horizontally adjacent pixels 35b can be aligned with each other along the direction perpendicular to the axial direction of the prism lenses 120a, and that a pair of vertically adjacent pixels 35b can be slightly misaligned with each other along the axial direction of the prism lenses 120a. With this configuration, none of the images divided along the axial direction of the prism lenses 120a may render black matrices BM only. Advantageously, it is possible to reduce or effectively prevent only the black matrices BM from being seen through the prism lenses 120a, and thus to prevent the occurrence of a black matrix moire phenomenon.

Figure 7:
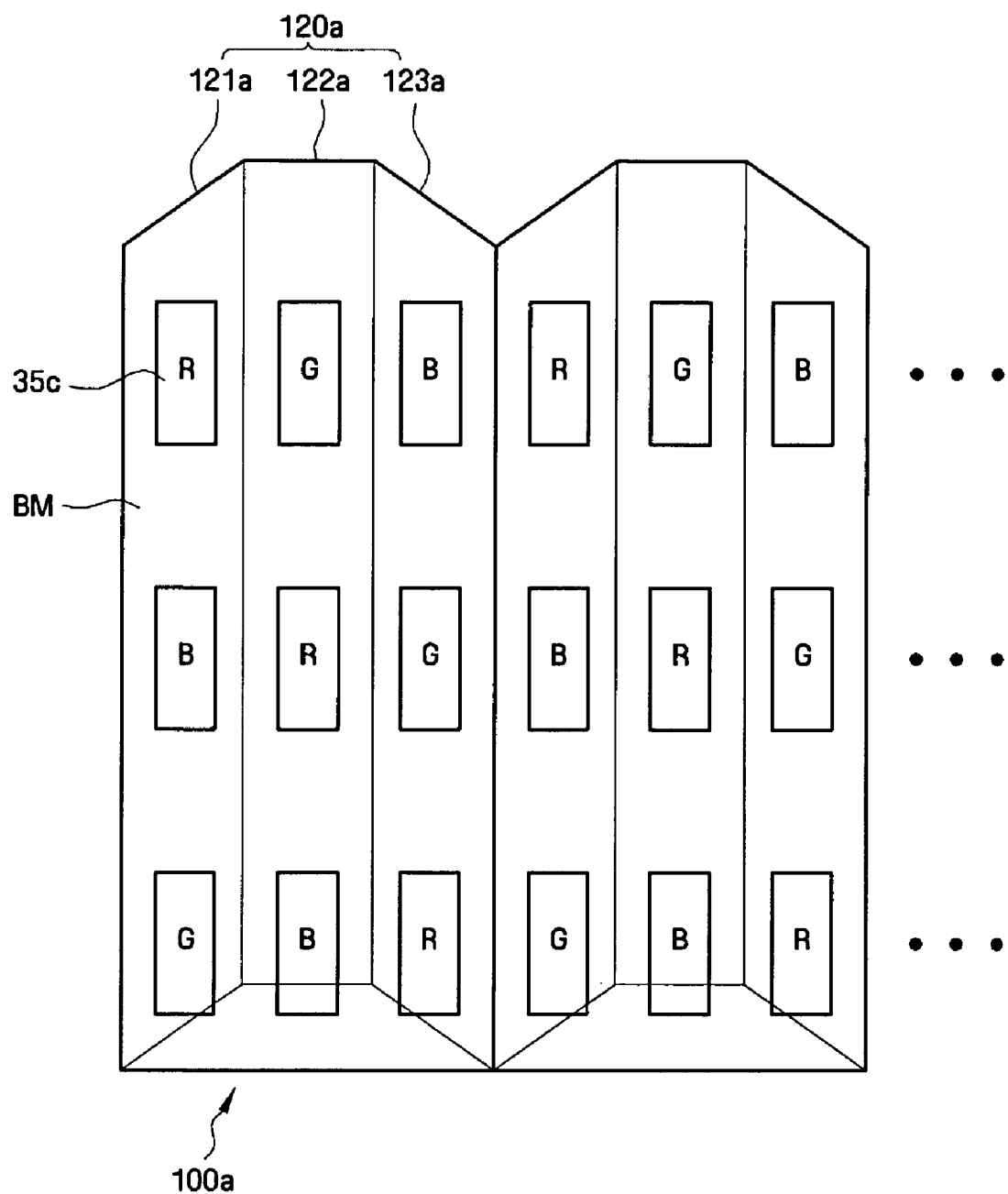
FIG. 7 illustrates another exemplary embodiment of a plan view of part of a lenticular sheet of a display device according to the present invention, and a plurality of pixels that underlie the lenticular sheet.

A display device according to another embodiment of the present invention will hereinafter be described in detail with reference to FIG. 7. FIG. 7 illustrates another exemplary embodiment of a plan view of a part of a lenticular sheet 100a of a display device according to the present invention, and a plurality of pixels 35c that underlie the lenticular sheet 100a. In FIGS. 1 through 4C and 7, like reference numerals indicate like elements, and thus, detailed descriptions thereof will be skipped.

Referring to FIG. 7, a plurality of pixels 35c are arranged in a matrix below the lenticular sheet 100a such that a pair of adjacent pixels 35c can represent different colors, and that a mosaic of colors can be provided. In contrast, the pixels 35a in FIG. 2 include a same pixel color corresponding to a single flat surface. In the illustrated embodiment, it is possible to reduce or effectively prevent a certain color from appearing dominant and prevent the occurrence of color bleeding.

Alternatively, the pixels 35c may be arranged in a zigzag manner along the axial direction of a plurality of prism lenses 120a of the lenticular sheet 100a. Advantageously, it is also possible to reduce or effectively prevent color bleeding and a black matrix moire phenomenon.

A display device according to another embodiment of the present invention will hereinafter be described in detail with reference to FIGS. 8A and 8B.

Figure 8A:
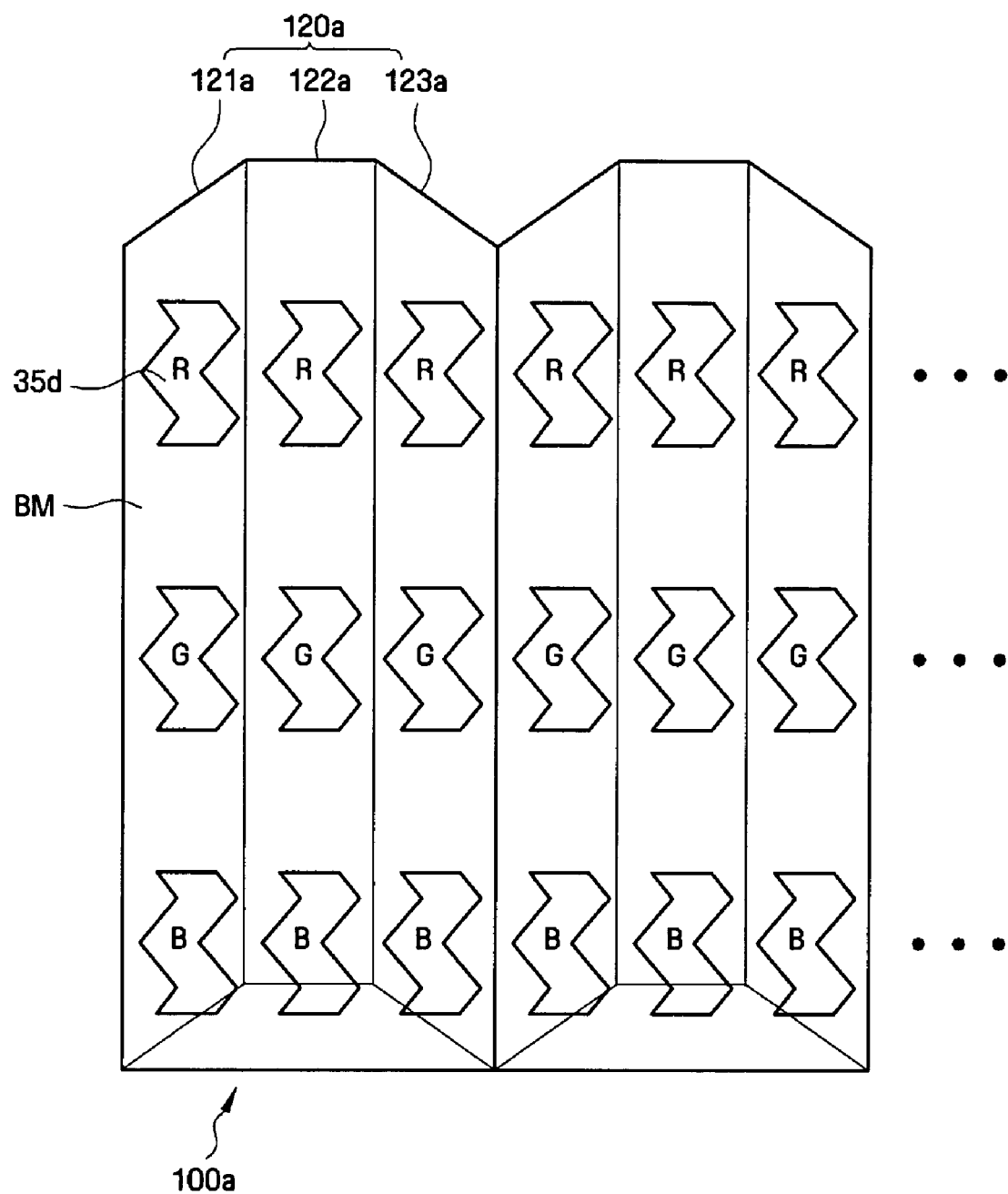
FIG. 8A illustrates another exemplary embodiment of a plan view of part of a lenticular sheet of a display device according to the present invention, and a plurality of pixels that underlie the lenticular sheet.
Figure 8B:
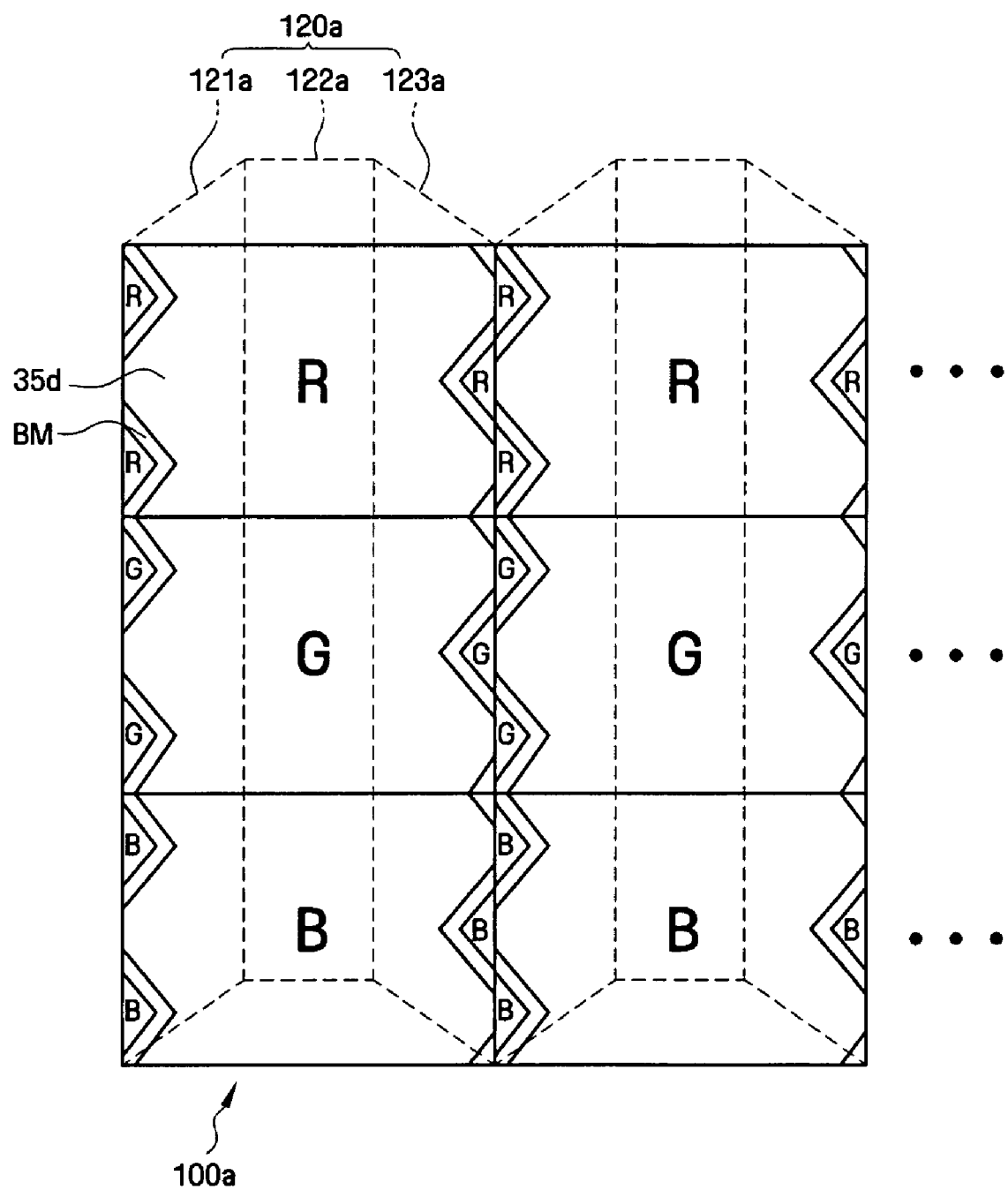
FIG. 8B illustrates a diagram for explaining what a plurality of pixels may look like to the naked eye of a viewer when being viewed through the lenticular sheet shown in FIG. 8A.

FIG. 8A illustrates another exemplary embodiment of a plan view of a part of a lenticular sheet of a display device according to the present invention, and a plurality of pixels that underlie the lenticular sheet, and FIG. 8B illustrates a diagram for explaining what a plurality of pixels may look like to the naked eye of a viewer when being viewed through the lenticular sheet illustrated in FIG. 8A. In FIGS. 1 through 4C, 8A and 8B, like reference numerals indicate like elements, and thus, detailed descriptions thereof will be skipped.

In the embodiment of FIGS. 8A and 8B, a plurality of pixels 35d are bent twice in a zigzag manner.

Referring to FIG. 8A, the pixels 35d may be bent twice in a zigzag manner substantially along the axial direction of a plurality of prism lenses 120a of the lenticular sheet 100a. The pixels 35d may form a predetermined angle with the axial direction of the prism lenses 120a. Alternatively, the pixels 35d may be bent twice in a zigzag manner along a direction other than the axial direction of the prism lenses 120a.

FIG. 8B illustrates a diagram for explaining what the pixels 35d may look like when being viewed from a predetermined observation point through the prism lenses 120a illustrated in FIG. 8A. Referring to FIG. 8B, each of the pixels 35d appears to be large enough to have the same width as that of the prism lenses 120a when being viewed through the lenticular sheet 100a illustrated in FIG. 8A. The pixels 35d, which are formed as zigzag patterns, may be seen through the lenticular sheet 100a as being wider they actually are.

In addition, a pair of horizontally adjacent pixels 35d may be seen through the lenticular sheet 100a as partially overlapping each other. Consequently, an image that can be seen from a predetermined observation position may include a number of pixels 35d corresponding to a main image, black matrices BM and pixels 35d adjacent to the pixels 35d corresponding to the main image. The pixels 35d corresponding to the main image account for most of the image that can be seen from the predetermined observation position, and the black matrices BM and the pixels 35d adjacent to the pixels 35d corresponding to the main image, account for only a relatively small portion of the image that can be seen from the predetermined observation position.

In the illustrated embodiment of FIGS. 8A and 8B, the pixels 35d are bent twice in a zigzag manner along the axial direction of the prism lenses 120a of the lenticular sheet 100a. Advantageously, it is possible to reduce or effectively prevent the occurrence of a black matrix moire phenomenon. In addition, in the illustrated embodiment of FIGS. 8A and 8B, a number of pixels 35d corresponding to a main image are seen through the lenticular sheet 100a as being partially overlapped by their respective adjacent pixels 35d. As a further advantage, it is possible to smoothly switch image frames, improve stereoscopic perception, and realize realistic moving images.

The axial direction of the prism lenses 120a may form an acute angle with the pixels 35d. With this configuration of the prism lenses 120a and the pixels 35d, it is possible to reduce or effectively prevent the occurrence of a black matrix moire phenomenon and color bleeding.

A display device according to another embodiment of the present invention will hereinafter be described in detail with reference to FIG. 9.

Figure 9:
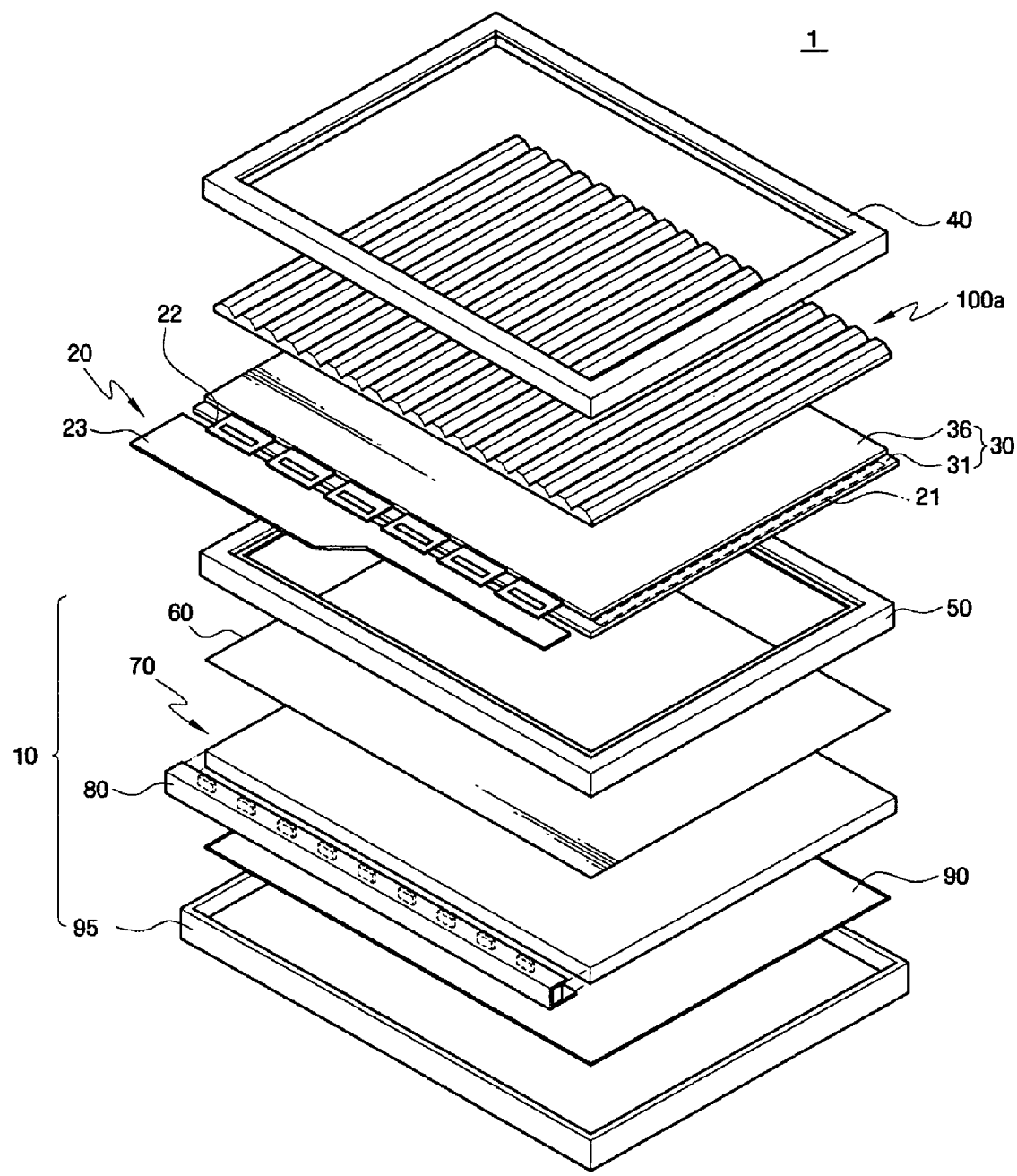
FIG. 9 illustrates an exploded perspective view of another exemplary embodiment of a display device according to the present invention.

FIG. 9 illustrates an exploded perspective view of another exemplary embodiment of a display device 1 according to the present invention. Referring to FIG. 9, the display device 1 may include a lower display panel 31, on which a thin-film transistor ("TFT") array is disposed, an upper display panel 36, which faces the lower display panel 31, and a liquid crystal layer (not shown), which is interposed between the lower display panel 31 and the upper display panel 36.

The display device 1 may also include a lenticular sheet 100a, a display panel assembly 20, a backlight assembly 10, a middle frame 50, an upper container 40 and a lower container 95.

The display panel assembly 20 includes a display panel 30, which includes the lower and upper display panels 31 and 36, the liquid crystal layer, a gate driving integrated circuit ("IC") 21, a plurality of data tape carrier packages ("TCPs") 22, and a printed circuit board ("PCB") 23.

The display panel 30 includes the lower display panel 31, on which a plurality of gate lines (not shown), a plurality of data lines (not shown), the TFT array, and a plurality of pixel electrodes are disposed, and the upper display panel 36, on which a plurality of color filters, black matrices and a common electrode are disposed. The upper display panel 36 faces the lower display panel 31. In alternative embodiments, the color filters and the common electrode may be disposed on the lower display panel 31, instead of being disposed on the upper display panel 36. The lenticular sheet 100a, which includes a plurality of prism lenses 120a, may be disposed on the display panel 30.

The gate driving IC 21 may be integrated on the lower display panel 31, and may be connected to the gate lines on the lower display panel 31. The data TCPs 22 may be connected to the data lines on the lower display panel 31. In exemplary embodiments, the data TCPs 22 may include tape automated bonding ("TAB") tapes, which connect a semiconductor chip to wiring patterns on a base film. Instead of TCPs, chip-on-films (COFs) may be used as chip film packages, but the present invention is not restricted to this.

Various driving elements for applying a gate driving signal to the gate driving IC 21 and applying a data driving signal to the data TCPs 22 may be mounted on the PCB 23.

The backlight assembly 10 includes a plurality of optical sheets 60, a light guide plate 70, one or more light sources 80 and a reflective sheet 90.

The light guide plate 70 guides light provided by the light sources 80 to the display panel assembly 20. The light guide plate 70 may be formed of a transparent material such as a plastic material (e.g., acrylic plastic), and may enable light generated by the light sources 80 to proceed toward the display panel 30, which is disposed above the light guide plate 70.

The light sources 80 provide light to the display panel 30. At least one light source 80 may be included in the backlight assembly 10. In exemplary embodiments, point light sources such as light-emitting diodes ("LEDs") may be used as the light sources 80.

The reflective sheet 90 is disposed on and facing a bottom surface of the light guide plate 70. The reflective sheet 90 reflects light emitted from the bottom of the light guide plate 70 back to the light guide plate 70, or to the display panel 30 through the light guide plate 70, thereby minimizing the loss of light emitted from the light sources 80 and improving the uniformity of light provided to the display panel 30 through the light guide plate 70.

The optical sheets 60 are disposed on and facing a top surface of the light guide plate 70. The optical sheets 60 diffuse and collect light incident thereupon from the light guide plate 70. The optical sheets 60 may include at least one of a diffusion sheet, a prism sheet and a protective sheet. The diffusion sheet diffuses light incident thereupon from the light guide plate 70, thereby reducing or effectively preventing concentration of light on certain regions. The prism sheet may include an array of a plurality of prisms, and may collect light diffused by the diffusion sheet and emit the collected light toward a direction substantially perpendicular to the display panel 30. Since most of the light transmitted through the prism sheet travels straight (e.g., perpendicular), the distribution of luminance of the protective sheet becomes uniform. The protective sheet provided on the prism sheet not only protects the surface of the prism sheet, but also diffuses light to obtain a uniform light distribution.

The reflective sheet 90, the light sources 80, the light guide plate 70, and the optical sheets 60 are sequentially contained in the lower container 95. The lower container 95 may be formed of a metal material, such as the material of a chassis, in order to provide sufficient rigidity and to serve as a ground. The sidewalls and a bottom portion of the lower container 95 may define a receiving space for the elements contained in the lower container 95. The lower container 95 and the middle frame 50 may also define a receiving space.

The middle frame 50 may be formed substantially as a rectangular frame having four sidewalls. The middle frame 50 may be fixed to the lower container 95.

The display panel 30 is disposed on the optical sheets 60, and particularly, on the protective sheet, and is contained in the middle frame 50. The middle frame 50 may be formed as a plastic mold frame in order to reduce damage to or effectively prevent the breakdown of various elements contained in the middle frame 50.

The upper container 40 may be coupled to the lower container 95 so as to cover peripheral edges of the top surface of the display panel 30, which is contained in the middle frame 50. The upper container 40 includes a window, which is disposed on the top surface of the upper container 40 and exposes the display panel 30. In an exemplary embodiment, the upper container 40, like the lower container 95, may be formed of a metal material, such as the material of a chassis, in order to provide sufficient rigidity and to serve as a ground. In one exemplary embodiment, the upper container 40 may be hook-coupled to the lower container 95.

The PCB 23 may be bent along an outer lateral surface of the middle frame 50, and may be disposed on a lateral surface or the bottom surface of the lower container 95.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device comprising:
    a display panel on which a plurality of pixels for displaying images are arranged in a matrix; and
    a lenticular sheet disposed above the display panel and comprising a plurality of prism lenses, each of the plurality of prism lenses including a first, a second and a third substantially linear planar surface,
    wherein
    the first, second and third linear surfaces are disposed extending in a first direction corresponding to a longitudinal direction of the prism lenses, and disposed extending substantially parallel to each other, and
    pairs of adjacent pixels are aligned substantially linearly with each other along both the first direction, and a second direction substantially perpendicular to the first direction, in a plan view.

2. The display device of claim 1, wherein the prism lenses have rounded edges.

3. The display device of claim 1, wherein each of a pair of adjacent pixels are different colors.

4. The display device of claim 1, wherein a number of pixels corresponding to a number of surfaces of each of the prism lenses are overlapped by each of the prism lenses along a direction perpendicular to the longitudinal direction of the prism lenses.

5. The display device of claim 1, wherein pairs of adjacent pixels are misaligned with each other along the first direction.

6. The display device of claim 5, wherein each group of misaligned pixels in the first direction includes pixels overlapping a common edge of adjacent surfaces of the prism lens, in the plan view.

7. The display device of claim 5, wherein a group of pixels includes pixels disposed substantially along the second direction and linearly aligned with each other in the second direction.

8. The display device of claim 7, further comprising a plurality of the group of pixels, wherein each pixel in each group of pixels overlaps a common edge of two adjacent surface of the prism lens, in the plan view.

9. The display device of claim 1, wherein the pixels are bent along a direction, other than the first.

10. The display device of claim 9, wherein the pixels are bent along the first direction of the prism lenses in a zigzag manner.

11. The display device of claim 1, wherein the first direction forms an acute angle with at least one boundary of each of the pixels.

12. The display device of claim 1, wherein the prism lenses have a variable refractive index.

13. The display device of claim 12, wherein the prism lenses are fluid lenses or liquid crystal lenses.

14. The display device of claim 1, wherein the prism lenses are Fresnel lenses.

15. The display device of claim 1, wherein an absolute value of a radius of curvature of at least one surface of each of the prism lenses is at least two times greater than an average radius of curvature of the prism lenses.

16. A lenticular sheet comprising:
    a base; and
    a plurality of prism lenses disposed on the base;

each of the plurality of prism lenses including a first surface, a second surface and a third surface, wherein each surface extends in a first direction which corresponds to a longitudinal direction of the prism lenses and to an alignment direction of pixels for displaying images of a display panel, the first surface, the second surface and the third surface being arranged substantially parallel to each other.

17. The lenticular sheet of claim 16, wherein the prism lenses have rounded edges.

18. The lenticular sheet of claim 16, wherein the prism lenses are Fresnel lenses.

19. A method of forming a display device, the method including:

disposing a plurality of pixels for displaying images of a display panel in a plurality of columns arranged substantially in a first direction, and in a plurality of rows arranged substantially in a second direction perpendicular to the first direction;

disposing a black matrix adjacent to all edges of each pixel of the plurality of pixels;

forming a lenticular sheet including a plurality of prism lenses, each of the prism lenses including a first surface, a second surface and a third surface, each surface being disposed extending in the first direction, the first surface, the second surface and the third surface being arranged substantially parallel to each other, wherein the second surface is disposed at a central area of the prism lens, in a plan view;

disposing the lenticular sheet above the display panel such that each view of the display panel through a prism includes an entire of a first pixel to be observed, black matrices that surround the first pixel to be observed, and part of a second pixel adjacent to the first pixel be observed.

* * * * *